UNITED STATES PATENT OFFICE.

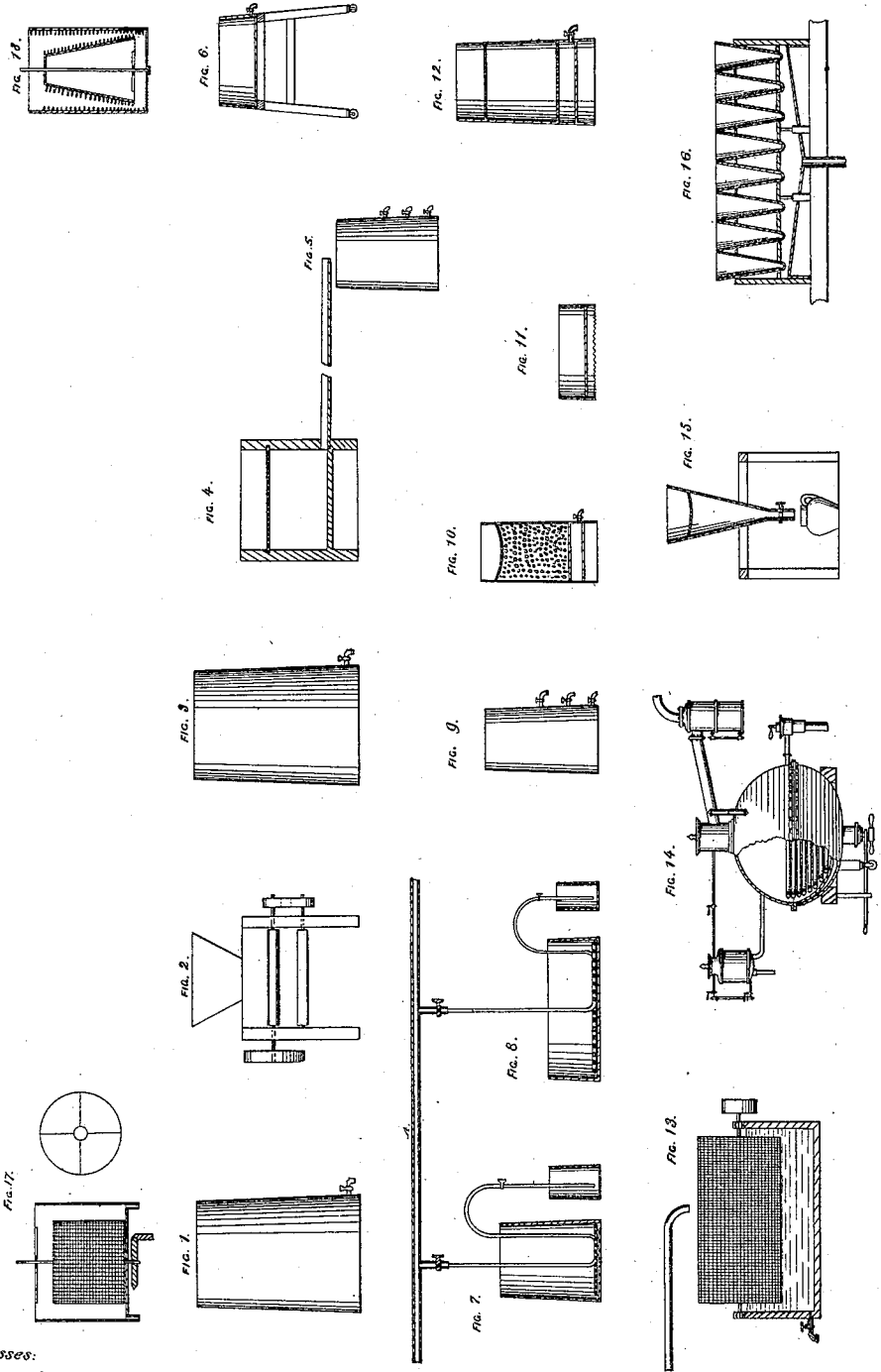

FREDK. W. GOSSLING, OF BUFFALO, NEW YORK, ASSIGNOR TO HIMSELF, HENRY F. BRIGGS, AND LYMAN BRADLEY.

IMPROVED MANUFACTURE OF SUGAR.

Specification forming part of Letters Patent No. 42,727, dated May 10, 1864.

*To all whom it may concern:*

Be it known that I, FREDERICK W. GOSSLING, of the city of Buffalo, county of Erie, and State of New York, assignor to HENRY F. BRIGGS, LYMAN BRADLEY, and F. W. GOSSLING, have invented or produced a new Sugar from Indian Corn and Beets (*Beta vulgaris*) as a New Article of Manufacture; and I do hereby declare that the following is a full and exact description thereof, having reference to the accompanying drawings, making a part of this specification.

Having reference to proportion of materials and chemicals used for a given quantity of sugar in the practice of my process, I in the first place take five hundred pounds of Indian corn of such qualities as are raised in the United States and soak it in water in open wooden tubs (represented in Figure 1) for about one week, and then take it out and pass it through a double set of brass rollers or a crushing-mill (represented in Fig. 2) and crush it very fine, and then take this crushed mass and soak it in water in other open tubs (represented in Fig. 3) for about two weeks, changing the water so frequently as to prevent fermentation. This constitutes the first step in my process.

I then take this mass from the tubs and knead it and strain it through a sieve into a long filter, drain, or box. (Shown at Fig. 4.) This drain may be about fifty feet long and one foot wide. A milky liquid comes through the sieve into the drain and passes over the drain, and is delivered into barrels or tanks. (Shown in Fig. 5.) A portion of the heavier matter will settle on the bottom of the drain, which matter is taken out and put into the barrels or tanks, like Fig. 5, where it, together with the milky liquid, is thoroughly washed in water, in which water I use a small quantity of caustic soda, sufficient to give the water a slight alkaline taste. This caustic soda has the effect to dissolve the albumen and gluten and hold them in solution and purify the saccharine matter. The saccharine matter will settle at the bottom of the tank, and the soda, albumen, and gluten, being held in solution, will be drawn off with the water through the cocks, leaving the saccharine matter at the bottom, which is again washed several times in pure clean water. I then have another covered tank (Fig. 7) ready, in which I put about one hundred gallons of water and about twelve pounds of chemically-pure oil of vitriol. In this tank there is a worm of lead pipe, which is connected with and takes steam from a steam-boiler. A steam-pipe leading from the boiler is shown at A. The latter end of this worm passes out through the top of the tank into a barrel, all of which is shown in Fig. 7. Steam passing through this worm of lead pipe causes the acid-water to boil. I am not aware that lead pipe has ever before been used for such purpose. I then take this saccharine matter from the washing and settling tanks, Fig. 5, and mix it with about twenty gallons of water to a thick liquid in a movable tub, Fig. 6, and put it very gradually into the boiling acid-water in the covered tanks, Fig. 7, and keep it there in a boiling state for about two hours. I then let the heat drop down to about 140° Fahrenheit, and then put in about five pounds of the extract of potato-eyes, and then by regulating the steam through the worm I raise the heat to about 158° Fahrenheit, which heat I keep up for about four hours. After that I raise the heat up to the boiling-point and keep it boiling for about twelve hours longer. So much as passes off during the boiling I supply by adding pure boiling water. This operation has converted the saccharine matter to a sugar-liquid, and completes the second step in the process.

Then I put this sugar-liquid into a separate tank, Fig. 9, and there neutralize it with either lime, baryta, whiting, or chalk, and allow it to settle, and then draw off the sugar-liquid. The tank is provided with several faucets, one above the other, for this purpose. The sediment I rewash several times until all the sugar matter is out, and then I put all the sugar-liquid into a vapor-vat, Fig. 8, which has a leaden worm, and is connected with a steam-boiler similar to Fig. 7. Then I put therein about one and a half pound pure terra magnesialis, calcined, and then pass steam through this worm, and cause the sugar-liquid to vapor down to about the consistency of thin sirup, and then let it cool down to about 80° Fahrenheit. When this is done I put in about two per cent. of fresh bullock's blood, and stir it up well, and then let it boil for about one-quarter hour. I skim off the scum and dirt which rises, and then filter it quickly through coarse powdered animal-charcoal, which filter is represented in Fig. 10. This completes the third step in the process, and the sirup is now ready for mixture with beet-sirup, as hereinafter described.

It will be observed that in no parts of this process is the corn material subjected to fermentation. I have purposely avoided fermentation in every part of my process, for the reason that it is always at the expense of the sugar matter, and it is an important feature in my process to avoid it.

I also use in connection and in combination with the corn-sirup made as above described a sirup made from beets, (*Beta vulgaris*,) which sirup is obtained from the beets in the following manner: Take two thousand five hundred pounds of beets and wash them thoroughly clean in any convenient manner. Fig. 13 represents a washing-machine which may be used for that purpose. Then grind or mash the washed beets in any suitable mill or machine similar in principle to a common cider-mill or tanner's bark-mill. (Shown in Fig. 18.) I then take the ground beets and obtain the sap or juice therefrom by subjecting the mass to the operation of a common straining-machine, (shown in Fig. 17,) or press the sap out in any other convenient manner. This constitutes the first step in the process of obtaining a sirup from beets.

I then put this sap into a steam-tank like that shown in Fig. 8, and raise the heat in said tank to about the boiling-point, and then put in from one to two pounds of quick-lime. This will purify and discolor the sap. I then filter it, and for this purpose I use a filtering-tub with two bottoms about two inches apart. The second or upper bottom is full of little holes. I cover this bottom with linen cloth, and then put on coarse animal-charcoal about fifteen inches deep, and then cover the charcoal with linen cloth again, and put over this a removable bottom or follower full of holes, all of which is shown in Fig. 12. This sap is then allowed to filter through, and is drawn off by a faucet placed between the two bottoms. This completes the second step in the process.

I now put this filtered sap into a settling-tank, like that shown in Fig. 9, and with it therein I put about five pounds of whiting, neutralized with oil of vitriol, and mix it well and let it settle. When settled this liquid or sap is drawn off and put into a vapor bath, similar to that shown in Fig. 8, and there it is vapored down to a thin sirup. During the time it is vaporing down to a thin sirup I put in about two per cent. of fresh bullock's blood to purify it. Taking off the scum which rises, I then again run it through the filter, Fig. 12, which has in the meantime been cleaned and furnished with fresh animal-charcoal. This completes the third step in the process, and the sirup is now ready for mixture with the corn-sirup.

Two thousand five hundred pounds of beets will make about an equal quantity of sirup as is made from five hundred pounds of corn.

The beet-sirup and the corn-sirup, prepared substantially as described, are now mixed in about equal proportions, (these proportions may be varied, and each sirup must be in exactly neutral state when mixed,) and the mixed sirup put into an ordinary steam-vacuum, Fig. 14, where it is vapored down sufficiently for crystallization. As a test, it may be considered fit for crystallization when a little of it taken between the thumb and finger will draw into a thread of one or one and a half inch in length, and then break and curl as it breaks. Then I put the sirup thus boiled down into large vats, Fig. 11, for cooling and crystallization. When crystallization commences it is put into conical molds, Fig. 16, where crystallization is completed, and the uncrystallized sirup will drain out, leaving a fine quality of sugar in the molds, which may then be removed for use. This completes the first step in my process after the corn and beet sirups have been combined. But in order further to purify and improve the quality of sugar and make it still more fine and clear I put onto the sugar while in the molds a small quantity of fine white beet-sirup and let it filter or drain through the sugar in the molds, which sirup will take with it all the coloring-matter which may remain, and thus render the sugar a clear white. After this sirup has drained through and the sugar fully dried it is ready for market, and is of a superior quality to the best cane-sugar. This last sirup is prepared in the following manner: Take about thirty pints, by measure, of pure beet-sirup and put therein about five eggs, in the shell, beaten fine in water, and then boil it well for about ten or fifteen minutes, stirring the same all the time it is boiling. Then filter it through about twenty pounds animal-charcoal in an extra filter for that purpose, Fig. 15. The first that runs through the filter will be water, the second is sweet water, and the third is the sirup, which I put upon the molds.

The sugar made from the combination of the corn and beet sirups as herein described is superior to the best cane-sugar.

I have represented an apparatus used in making this new sugar for the purpose of making my description full and clear.

I claim—

As a new article of manufacture, a sugar produced from corn and beets.

FREDERICK W. GOSSLING

Witnesses:
E. B. FORBUSH,
B. H. MUEHLE.